US008633663B2

(12) United States Patent
Sonoda et al.

(10) Patent No.: US 8,633,663 B2
(45) Date of Patent: Jan. 21, 2014

(54) CONTROL DEVICE THAT DETECTS WHETHER OR NOT IRREVERSIBLE DEMAGNETIZATION HAS OCCURRED IN PERMANENT MAGNET OF PERMANENT MAGNET SYNCHRONOUS MOTOR

(75) Inventors: Naoto Sonoda, Yamanashi (JP); Yasusuke Iwashita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 44 days.

(21) Appl. No.: 13/494,087

(22) Filed: Jun. 12, 2012

(65) Prior Publication Data

US 2013/0026959 A1    Jan. 31, 2013

(30) Foreign Application Priority Data

Jul. 26, 2011  (JP) ................................. 2011-163302

(51) Int. Cl.
*H02P 6/12*  (2006.01)
(52) U.S. Cl.
USPC ..................................................... 318/400.15
(58) Field of Classification Search
None
See application file for complete search history.

(56) References Cited

U.S. PATENT DOCUMENTS

| 5,650,706 | A | 7/1997 | Yamada et al. |
| 6,504,329 | B2 * | 1/2003 | Stancu et al. ............. 318/400.23 |
| 2002/0175674 | A1 | 11/2002 | Raftari et al. |
| 2004/0128105 | A1 * | 7/2004 | Harke ........................... 702/151 |
| 2006/0119312 | A1 | 6/2006 | Okamura et al. |
| 2007/0145926 | A1 * | 6/2007 | Egami et al. ................... 318/432 |
| 2010/0045335 | A1 | 2/2010 | Cawthorne et al. |
| 2010/0139333 | A1 | 6/2010 | Maekawa et al. |

FOREIGN PATENT DOCUMENTS

| DE | 10218538 A1 | 11/2002 |
| DE | 102009038245 A1 | 5/2010 |
| DE | 102009057433 A1 | 8/2010 |
| JP | 9-294354 A | 11/1997 |
| JP | 2000-35370 A | 2/2000 |
| JP | 2006-62390 A | 3/2006 |
| JP | 3857425 B2 | 12/2006 |
| JP | 2007-43889 A | 2/2007 |
| JP | 2008-29082 A | 2/2008 |
| JP | 2010-193539 A | 9/2010 |

OTHER PUBLICATIONS

Office Action mailed May 14, 2013 corresponds to German patent application No. 102012014319.2.
A JP Office Action, dated Aug. 28, 2012, issued in JP Application No. 2011-163302.

* cited by examiner

*Primary Examiner* — Lincoln Donovan
*Assistant Examiner* — Zoheb Imtiaz
(74) *Attorney, Agent, or Firm* — Lowe Hauptman & Ham LLP (57) ABSTRACT

An estimated torque constant calculation unit calculates an estimated torque constant relating to the permanent magnet synchronous motor from a current representative value and an acceleration representative value acquired from a plurality of current values and a plurality of acceleration values in the same operation state over a plurality of periods of a sinusoidal command signal and a predetermined inertia relating to the permanent magnet synchronous motor. A demagnetization detection unit detects whether or not irreversible demagnetization has occurred in the permanent magnet of the permanent magnet synchronous motor based on a difference between the estimated torque constant and a predetermined torque constant relating to the permanent magnet synchronous motor.

5 Claims, 4 Drawing Sheets

CONTROL DEVICE THAT DETECTS WHETHER OR NOT IRREVERSIBLE DEMAGNETIZATION HAS OCCURRED IN PERMANENT MAGNET OF PERMANENT MAGNET SYNCHRONOUS MOTOR

RELATED APPLICATIONS

The present application is based on, and claims priority from, Japanese Application Number 2011-163302, filed Jul. 26, 2011, the disclosure of which is hereby incorporated by reference herein in its entirety.

BACKGROUND OF THE INVENTION

1. Field of the Invention

The present invention relates to a control device that detects whether or not irreversible demagnetization has occurred in a permanent magnet of a permanent magnet synchronous motor, which operates a driven object, such as a work and tool, in a machine tool, etc.

2. Description of Related Art

Conventionally, a permanent magnet synchronous motor, such as a rotary servomotor in which a permanent magnet is provided in any one of a stator and a rotor, a liner servomotor in which a permanent magnet is provided in any one of a stator and a slider, and a vibration servomotor in which a permanent magnet is provided in any one of a stator and a vibrator, is widely used in various fields.

In a permanent magnet synchronous motor, there is a case where irreversible demagnetization occurs in a permanent magnet of the permanent magnet synchronous motor due to an abnormal temperature rise of the permanent magnet of the permanent magnet synchronous motor, an abnormal drive current that flows through the winding of the permanent magnet synchronous motor, etc.

In such a case, it is not possible for the permanent magnet synchronous motor to generate a predetermined torque, and therefore, the actual track of movement of a driven object, that is operated by the permanent magnet synchronous motor, deviates from the track of movement of the driven object commanded by an upper control device, such as a CNC (computer numerical control), and there is a possibility that the track precision deteriorates and the driven object is broken under certain circumstances.

Consequently, it is necessary to detect whether or not irreversible demagnetization has occurred in the permanent magnet of the permanent magnet synchronous motor in order to avoid the deterioration of the track precision and the breakage of the driven object under certain circumstances due to the reduction of acceleration and deceleration performance caused by the irreversible demagnetization in the permanent magnet of the permanent magnet synchronous motor.

Conventionally, a control device that specifies the position of the permanent magnet in which irreversible demagnetization has occurred by comparing the calculated inertia of the driven object of the permanent magnet synchronous motor and a predetermined inertia of the permanent magnet synchronous motor in each magnetic pole position detected based on a rotation angle of a rotor of the permanent magnet synchronous motor in order to detect irreversible demagnetization in the permanent magnet of the permanent magnet synchronous motor, is proposed in, for example, Japanese Patent No. 3857425 (JP3857425B2).

However, the conventional control device compares the calculated inertia and the predetermined inertia in each position of the permanent magnet, and therefore, it is necessary to rotate the rotor of the permanent magnet synchronous motor at least one electrical angle or more. Due to this, when the operation range of the drive shaft of the permanent magnet synchronous motor is limited, such as when the driven object is moved along an arc using the permanent magnet synchronous motor in a machine tool etc., and therefore, it is not possible to rotate the rotor of the permanent magnet synchronous motor one electrical angle or more, it is not possible to specify the position of irreversible demagnetization in the permanent magnet of the permanent magnet synchronous motor. Further, the conventional control device detects demagnetization indirectly by estimating the inertia. In this case, calculation is performed by dividing the product of the torque constant and the detected current by the detected acceleration, however, in general, the acceleration is calculated from a difference in speed, and therefore, noise is likely to be included and an error due to division is likely to be included. Therefore, when the acceleration is small, there is a case where the operation precision deteriorates considerably.

SUMMARY OF THE INVENTION

The present invention provides, as an aspect, a control device capable of appropriately detecting whether or not irreversible demagnetization has occurred in a permanent magnet of a permanent magnet synchronous motor even if the operation range of a drive shaft of the permanent magnet synchronous motor is limited. Further, demagnetization is detected directly by estimating a torque constant. In this case calculation is performed by dividing the product of inertia and detected acceleration by detected current, and therefore, an error caused by division is unlikely to be included and as a result of this, it is possible to provide a control device with excellent precision.

According to an aspect of the present invention, the control device includes a sinusoidal command signal generation unit configured to generate a sinusoidal command signal to any one of a position command signal, a speed command signal, and a torque command signal supplied to a permanent magnet synchronous motor, a current value acquisition unit configured to acquire a current value of a current flowing through the permanent magnet synchronous motor, an acceleration value acquisition unit configured to acquire an acceleration value of the permanent magnet synchronous motor, an estimated torque constant calculation unit configured to calculate an estimated torque constant relating to the permanent magnet synchronous motor from a current representative value and an acceleration representative value acquired from a plurality of current values and a plurality of acceleration values in the same operation state over a plurality of periods of the sinusoidal command signal and a predetermined inertia relating to the permanent magnet synchronous motor, and a demagnetization detection unit configured to detect whether or not irreversible demagnetization has occurred in a permanent magnet of the permanent magnet synchronous motor based on a difference between the estimated torque constant and a predetermined torque constant relating to the permanent magnet synchronous motor.

Preferably, according to an aspect of the present invention, the control device further includes a friction calculation unit configured to calculate friction in accordance with a speed value or a polarity of speed of the permanent magnet synchronous motor and a corrected current value generation unit configured to generate a corrected current value, which is the current value corrected in accordance with the friction.

Preferably, according to an aspect of the present invention, the control device further includes an offset component removal unit configured to remove an offset component of the current value of the current flowing through the permanent magnet synchronous motor.

Preferably, the demagnetization detection unit compares the difference with each of a plurality of demagnetization levels and generates an alarm when irreversible demagnetization occurs in the permanent magnet of the permanent magnet synchronous motor, or outputs comparison results between the difference and each of the plurality of demagnetization levels in order to limit the operation of the permanent magnet synchronous motor.

Preferably, the demagnetization detection unit has a reduction rate calculation and speed gain change unit configured to calculate a reduction rate of the torque constant of the permanent magnet synchronous motor based on the estimated torque constant and the predetermined torque constant and to change a speed gain of the permanent magnet synchronous motor based on the reduction rate.

According to an aspect of the present invention, the estimated torque constant relating to the permanent magnet synchronous motor is calculated from the current representative value and the acceleration representative value acquired from a plurality of current values and a plurality of acceleration values in the same operation state over a plurality of periods of the sinusoidal command signal and the predetermined inertia relating to the permanent magnet synchronous motor, and whether or not irreversible demagnetization has occurred in the permanent magnet of the permanent magnet synchronous motor is detected based on the difference between the estimated torque constant and the predetermined torque constant relating to the permanent magnet synchronous motor. Due to this, the permanent magnet synchronous motor performs a periodic operation in accordance with the sinusoidal command signal for a brief time at the time of calculation of the estimated torque constant, and therefore, it is possible to reduce the operation range of the permanent magnet synchronous motor at the time of calculation of the estimated torque constant. Since it is possible to reduce the operation range of the permanent magnet synchronous motor as described above, it is no longer necessary to rotate the rotor of the permanent magnet synchronous motor one electrical angle or more. Consequently, it is possible to appropriately detect irreversible demagnetization in the magnet of the rotor of the permanent magnet synchronous motor even if the operation range of the drive shaft of the permanent magnet synchronous motor is limited.

BRIEF DESCRIPTION OF THE DRAWINGS

The objects, features, and advantages of the present invention will be made clearer by the description of the following embodiments relating to the accompanying drawings.

DETAILED DESCRIPTION

Embodiments of the control device according to the present invention are explained with reference to the drawings. In the drawings, the same symbol is attached to the same component.

Figure 1:
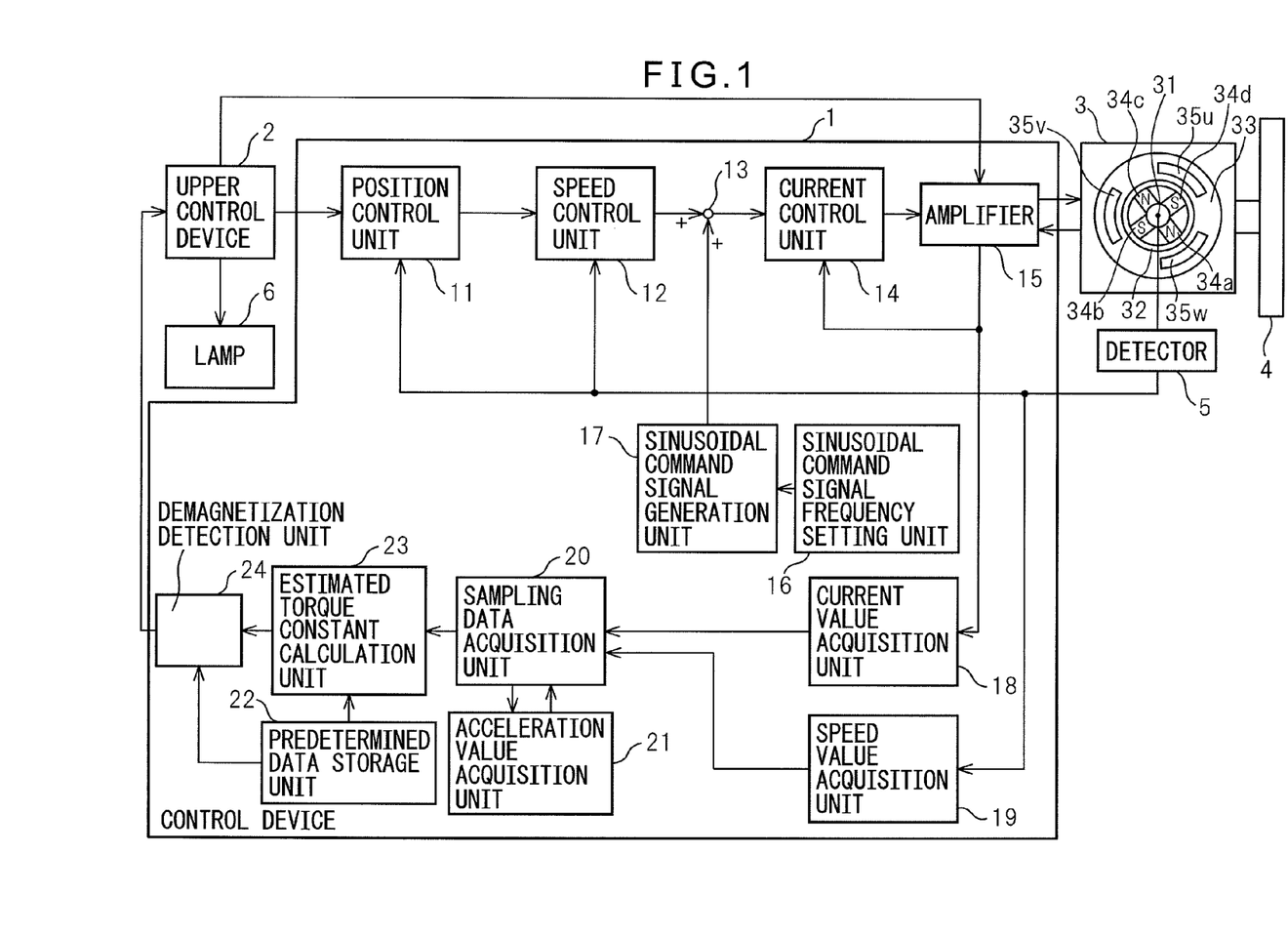
FIG. 1 is a block diagram of a system having a control device of a first embodiment of the present invention.

Referring to the drawings, FIG. 1 is a block diagram of a system having a control device of a first embodiment of the present invention. In FIG. 1, a control device 1 controls the position, speed, torque, etc., of a permanent magnet synchronous motor 3 based on a command signal in accordance with a work process instructed by an upper control device 2, such as a CNC (computer numerical control) connected to the control device 1. By controlling the control device 1, a driven object 4 such as a table connected to the permanent magnet synchronous motor 3, an arm connected thereto and a work attached thereto and detached therefrom performs a predetermined motion (for example, arc motion).

In order for the control device 1 to control the position, speed, torque, etc., of the permanent magnet synchronous motor 3, there is provided a detector 5 configured to detect the speed (rotating speed) of the permanent magnet synchronous motor 3 and to supply the detected speed to the control device 1. For example, an encoder configured to generate a pulse in proportion to the speed of the permanent magnet synchronous motor is used as the detector 5.

The permanent magnet synchronous motor 3 may be any motor, such as a motor for changing the position and attitude of a table that holds a work in a machine tool, a motor for rotating and operating an arm of a robot, etc. In the present embodiment, the permanent magnet synchronous motor 3 is a rotary servomotor including a rotor 32 having a rotating shaft 31 to which the detector 5 is attached and a stator 33 arranged so as to surround the rotor 32.

The rotor 32 has four permanent magnets 34a, 34b, 34c, and 35d arranged at 90° intervals. The permanent magnets 34a, 34b, 34c, and 34d are arranged so that the end parts thereof on the side of the stator 33 are separated 90° from one another in the rotation direction of the rotor 32 and the end parts on the outside of the permanent magnets 34a, 34b, 34c, and 34d are alternately the N pole, S pole, N pole, and S pole.

The stator 33 has three coils 35u, 35v, and 35w arranged at 120° intervals and to which U-phase, V-phase, and W-phase alternating currents are supplied, respectively. Consequently, the permanent magnet synchronous motor 3 functions as a three-phase synchronous motor.

According to the present embodiment, as described later in detail, the control device 1 detects whether or not irreversible demagnetization has occurred in the permanent magnets 34a, 34b, 34c, and 34d and outputs the detection result of whether or not irreversible demagnetization has occurred to the upper control device 2, and the upper control device 2 generates an alarm when irreversible demagnetization has occurred in the permanent magnets 34a, 34b, 34c, and 34d or limits the operation of the permanent magnet synchronous motor 3. Further, in the present embodiment, as described later in detail, the upper control device 2 lights a lamp 6, such as LED, to generate an alarm and stops the operation of the permanent magnet synchronous motor 3.

The control device 1 comprises a position control unit 11, a speed control unit 12, an adder 13, a current control unit 14, an amplifier 15, a sinusoidal command signal frequency setting unit 16, a sinusoidal command signal generation unit 17, a current value acquisition unit 18, a speed value acquisition unit 19, a sampling data storage unit 20, an acceleration acquisition unit 21, a predetermined data storage unit 22, an estimated torque constant calculation unit 23, and a demagnetization detection unit 24.

Each unit of the control device 1 and the upper control device 2 are shown so as to have separate configurations for the sake of convenience, however, they may not be those corresponding to each individual piece of hardware, or may be implemented by hardware or software in which there is no clear demarcation between each unit. When they are implemented by software, it may also be possible to configure each unit as an individual part of software, however, they may be implemented by software in which there is no clear demarcation between each unit.

The position control unit 11 performs an operation in accordance with a position command signal from the upper control device 2 and a position feedback signal generated by integrating a speed feedback signal from the detector 5 based on a predetermined position gain. The speed control unit 12 performs an operation in accordance with a speed command signal from the position control unit 11 and the speed feedback signal from the detector 5 based on the predetermined speed gain. The adder 13 adds a torque command signal from the speed control unit 12, which is input to one of input parts, and a sinusoidal command signal, as described later, which is input to the other input part and supplies an output signal of the adder 13 to the current control unit 14.

The current control unit 14 performs an operation in accordance with the output signal of the adder 13 and a current feedback signal from the amplifier 15. The amplifier 15 controls power to be supplied to the permanent magnet synchronous motor 3 in accordance with an output signal of the current control unit 14, which is input to the amplifier 15. In the present embodiment, the current feedback signal means q-phase current feedback, which is an effective current as a result of sampling of three-phase current feedback of the permanent magnet synchronous motor 3 that functions as a three-phase synchronous motor and dq conversion from the three-phase alternating current value into a two-phase alternating current value using phase information acquired by the detector 5.

The sinusoidal command signal frequency setting unit 16 sets the frequency of a sinusoidal command signal generated by the sinusoidal command signal generation unit 17 to a predetermined frequency (for example, 10 Hz). The sinusoidal command signal generation unit 17 supplies a sinusoidal command signal having the frequency set by the sinusoidal command signal frequency setting unit 16 to the other input part of the adder 13.

The current value acquisition unit 18 acquires the current feedback signal from the amplifier 15 as a current value at a predetermined sampling period T (for example, T=10 milliseconds) and stores it as a current feedback value in the sampling data storage unit 20. The speed value acquisition unit 19 acquires the speed feedback signal from the detector 5 as a speed value at the predetermined sampling period T (for example, T=10 milliseconds) and stores it as a speed feedback value in the sampling data storage unit 20.

The acceleration value acquisition unit 21 calculates an acceleration value from the speed feedback value stored in the sampling data storage unit 20 and stores the calculated acceleration value in the sampling data storage unit 20. In the present embodiment, the acceleration value acquisition unit 21 calculates an acceleration value $a=(v(n)-v(n-1))/T$ from a difference between a speed feedback value $v(n)$ acquired by a current sampling and a speed feedback value $v(n-1)$ acquired by a previous sampling.

In the predetermined data storage unit 22, at least one demagnetization level that serves as a reference used to detect whether or not irreversible demagnetization has occurred in the permanent magnets 34a, 34b, 34c, and 34d, a predetermined torque constant relating to the permanent magnet synchronous motor 3, i.e., an actual torque constant of the permanent magnet synchronous motor 3 or the actual torque constant of the permanent magnet synchronous motor 3 to which the driven object 4 is attached, and a predetermined inertia relating to the permanent magnet synchronous motor 3, i.e., actual inertia of the permanent magnet synchronous motor 3 or inertia corresponding to the sum of the actual inertia of the permanent magnet synchronous motor 3 and the actual inertia of the driven object 4, are stored.

In the present embodiment, in the predetermined data storage unit 22, a demagnetization level 1, a demagnetization level 2 lower than the demagnetization level 1, an actual torque constant Kt of the permanent magnet synchronous motor 3 to which the driven object 4 is attached, and inertia J corresponding to the sum of the actual inertia of the permanent magnet synchronous motor 3 and the actual inertia of the driven object 4, are stored.

The estimated torque constant calculation unit 23 extracts the maximum value and the minimum value of the current feedback value stored in the sampling data storage unit 20 for several periods (for example, 20 periods) of the sinusoidal command waveform generated by the sinusoidal command signal generation unit 17. That is, by periodically varying the torque command signal value in accordance with the sinusoidal command signal, the maximum peak and the minimum peak appear in the current feedback value in each period of the sinusoidal command signal, and then, the estimated torque constant calculation unit 23 extracts the value of the maximum peak and the value of the minimum peak.

After extracting the maximum value and the minimum value of the current feedback value, the estimated torque constant calculation unit 23 calculates an average Imax, which is the average value of the maximum values of the current feedback values and an average Imin, which is the average value of the minimum values of the current feedback values. Then, the estimated torque constant calculation unit 23 calculates an average current I as a current representative value, which is the average of the absolute value of the maximum value of the current feedback value and the absolute value of the minimum value of the current feedback value. Consequently, the average current I is represented by:

$$(|\text{average Imax}|+|\text{average Imin}|)/2.$$

Similarly, the estimated torque constant calculation unit 23 extracts the maximum value and the minimum value of the acceleration values stored in the sampling data storage unit 20 for several periods (for example, 20 periods) of the sinusoidal command waveform generated by the sinusoidal command signal generation unit 17. That is, by periodically varying the torque command signal value in accordance with the sinusoidal command signal, the maximum peak and the minimum peak appear in the acceleration value in each period of the sinusoidal command signal, and then, the estimated torque constant calculation unit 23 extracts the value of the maximum peak and the value of the minimum peak.

After extracting the maximum value and the minimum value of the acceleration value, the estimated torque constant calculation unit 23 calculates an average Amax, which is the average value of the maximum values of the acceleration values and an average Amin, which is the average value of the minimum values of the acceleration values. Then, the estimated torque constant calculation unit 23 calculates an average acceleration a as an acceleration representative value, which is the average of the absolute value of the maximum value of the acceleration value and the absolute value of the minimum value of the acceleration value. Consequently, the average acceleration a is represented by:

$$(|\text{average Amax}|+|\text{average Amin}|)/2.$$

Since the current feedback value and the acceleration value are extracted in accordance with the sinusoidal command signal, when the torque command signal output from the speed control unit 12 is not zero, the estimated torque constant calculation unit 23 corrects the values by an amount corresponding to the influence.

After calculating the average current I and the average acceleration a', the estimated torque constant calculation unit 23 calculates an estimated torque constant Ks according to the expression Ks=J·a'/I. Then, the demagnetization detection unit 24 calculates a difference between the estimated torque constant Ks and the actual torque constant Kt and determines whether or not the difference between the estimated torque constant Ks and the actual torque constant Kt is larger than the demagnetization level 1 and whether or not the difference between the estimated torque constant Ks and the actual torque constant Kt is larger than the demagnetization level 2.

When the difference between the estimated torque constant Ks and the actual torque constant Kt is larger than the demagnetization level 1, the demagnetization detection unit 24 supplies the information that the difference between the estimated torque constant Ks and the actual torque constant Kt is larger than the demagnetization level 1, as the comparison result, to the upper control device 2 and the upper control device 2 limits the operation of the permanent magnet synchronous motor 3. In the present embodiment, when the difference between the estimated torque constant Ks and the actual torque constant Kt is larger than the demagnetization level 1, the upper control device 2 turns off the power source of the amplifier 15 and stops the operation of the permanent magnet synchronous motor 3.

When the difference between the estimated torque constant Ks and the actual torque constant Kt is smaller than the demagnetization level 1 and larger than the demagnetization level 2, the demagnetization detection unit 24 supplies the information that the difference between the estimated torque constant Ks and the actual torque constant Kt is smaller than the demagnetization level 1 and larger than the demagnetization level 2, as the comparison result, to the upper control device 2 and the upper control device 2 generates an alarm. In the present embodiment, when the difference between the estimated torque constant Ks and the actual torque constant Kt is smaller than the demagnetization level 1 and larger than the demagnetization level 2, the upper control device 2 lights the lamp 6.

Figure 2:
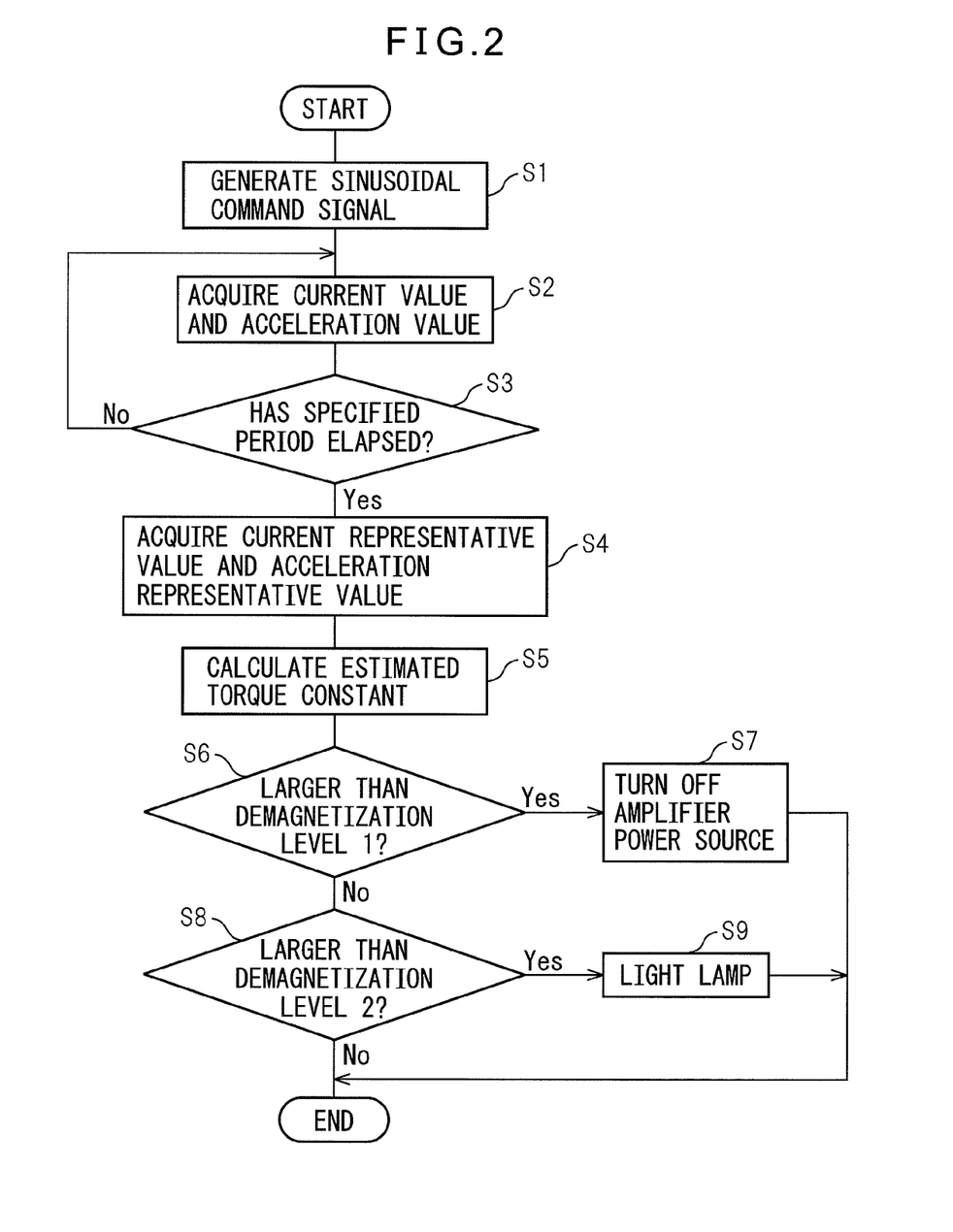
FIG. 2 is a flowchart of the operation of the control device of the first embodiment of the present invention.

FIG. 2 is a flowchart of the operation of the control device of the first embodiment of the present invention. This flowchart is performed after the control device 1 receives the command signal to start demagnetization detection processing from the upper control device 2.

In step S1, the sinusoidal command signal generation unit 17 generates a sinusoidal command signal. Next, in step S2, the current value acquisition unit 18 acquires the current feedback signal as the current value and the speed value acquisition unit 19 acquires the speed feedback signal as the speed value.

Next, in step S3, the estimated torque constant calculation unit 23 determines whether or not the specified period T has elapsed. When the specified period T has not yet elapsed, the procedure returns to step S2. In contrast to this, when the specified period T has elapsed, in step S4, the estimated torque constant calculation unit 23 acquires the average current I as the current representative value and the average acceleration a' as the acceleration representative value acquired from the plurality of current values and the plurality of acceleration values in the same operation state (for example, in the arc motion of the driven object 4) over the period T as a plurality of periods of the sinusoidal command signal.

Next, in step S5, the estimated torque constant calculation unit 23 calculates the estimated torque constant Ks according to the expression Ks=J·a'/I. Next, in step S6, the demagnetization detection unit 24 determines whether or not the difference between the estimated torque constant Ks and the actual torque constant Kt is larger than the demagnetization level 1.

When the difference between the estimated torque constant Ks and the actual torque constant Kt is larger than the demagnetization level 1, in step S7, the demagnetization detection unit 24 supplies the information that the difference between the estimated torque constant Ks and the actual torque constant Kt is larger than the demagnetization level 1, as the comparison result, to the upper control device 2 and the upper control device 2 turns off the power source of the amplifier 15, stops the operation of the permanent magnet synchronous motor 3, and exits the processing.

When the difference between the estimated torque constant Ks and the actual torque constant Kt is equal to or less than the demagnetization level 1, in step S8, the demagnetization detection unit 24 determines whether or not the difference between the estimated torque constant Ks and the actual torque constant Kt is larger than the demagnetization level 2. When the difference between the estimated torque constant Ks and the actual torque constant Kt is larger than the demagnetization level 2, in step S9, the demagnetization detection unit 24 supplies the information that the difference between the estimated torque constant Ks and the actual torque constant Kt is smaller than the demagnetization level 1 and larger than the demagnetization level 2, as the comparison result, to the upper control device 2 and the upper control device 2 lights the lamp 6 and exits the processing. When the difference between the estimated torque constant Ks and the actual torque constant Kt is equal to or less than the demagnetization level 2, the upper control device 2 exits the processing without performing anything.

According to the present embodiment, the permanent magnet synchronous motor 3 performs the periodic operation in accordance with the sinusoidal command signal for a brief time at the time of calculation of the estimated torque constant, and therefore, it is possible to reduce the operation range of the permanent magnet synchronous motor 3 at the time of calculation of the estimated torque constant. Since it is possible to reduce the operation range of the permanent magnet synchronous motor 3 as described above, it is no longer necessary to rotate the rotor 32 one electrical angle or more. Consequently, it is possible to appropriately detect irreversible demagnetization in the magnets 34a, 34b, 34c, and 34d even if the operation range of the drive shaft 31 is limited, such as in the arc motion.

Further, since the current feedback value signal and the speed feedback signal over a plurality of periods are used, it is possible to reduce the influence of noise by averaging over the plurality of periods. Furthermore, by setting a plurality of demagnetization levels, it is possible to take measures in accordance with the demagnetization level, and therefore, safety is improved.

Figure 3:
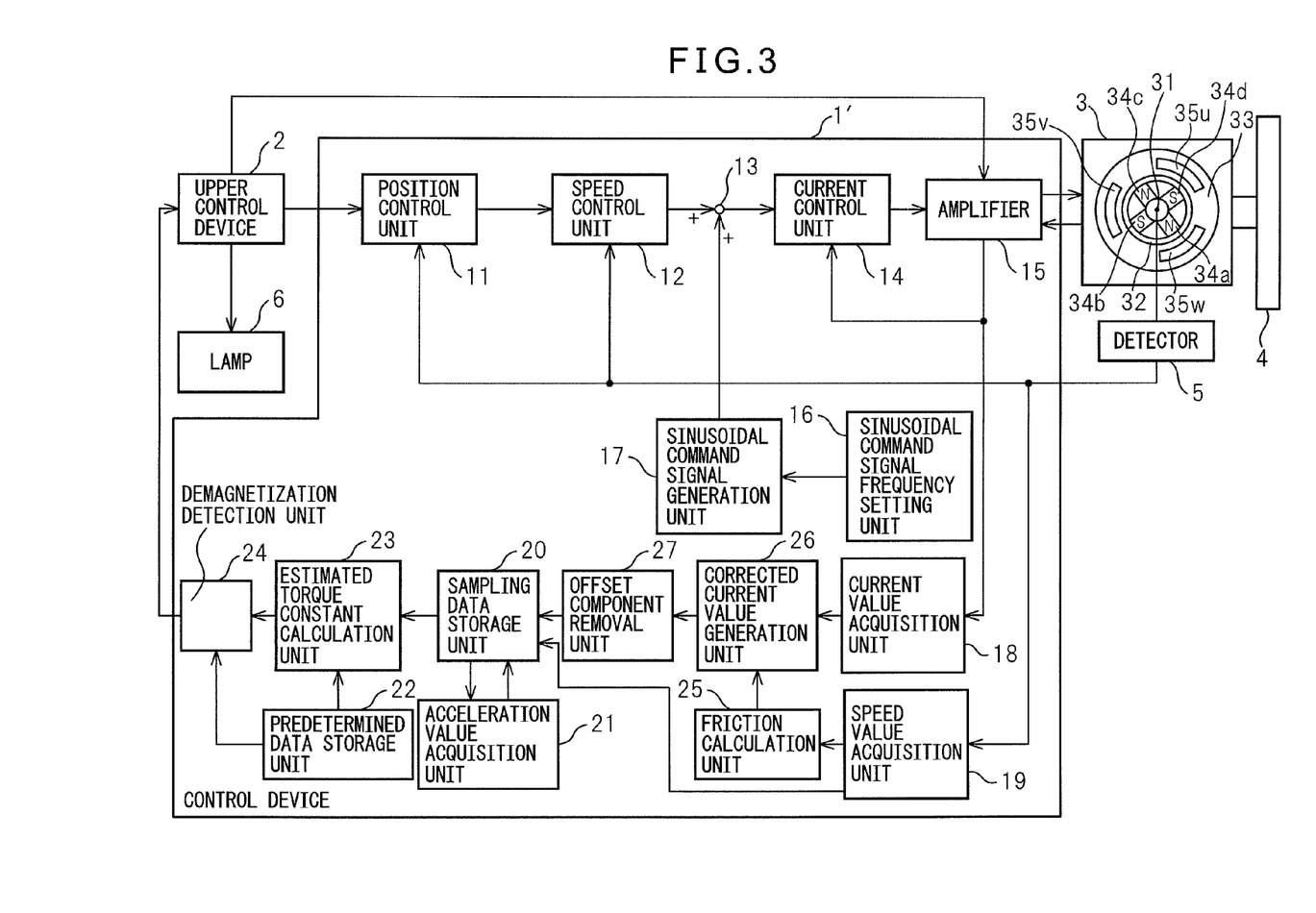
FIG. 3 is a block diagram of a system having a control device of a second embodiment of the present invention.

FIG. 3 is a block diagram of a system having a control device of a second embodiment of the present invention. In FIG. 3, a control unit 1' further comprises a friction calculation unit 25, a corrected current value generation unit 26, and an offset component removal unit 27 in addition to the components of the control unit in FIG. 1.

The friction calculation unit 25 calculates friction (viscous friction and coulomb friction) in accordance with the speed value or the polarity of speed acquired in the speed value acquisition unit 19. The corrected current value generation unit 26 corrects the current value acquired in the current value acquisition unit 18 in accordance with the friction calculated in the friction calculation unit 25 and generates a corrected current value. The offset component removal unit 27 removes an offset component of the corrected current value generated in the corrected current value generation unit 26. The offset component removal unit 27 includes, for example, a high-pass filter.

The calculation of friction by the friction calculation unit 25, the generation of the corrected current value by the corrected current value generation unit 26, and the removal of the offset component of the corrected current value by the offset component removal unit 27 are performed in step S4 of the flowchart in FIG. 2.

When a constant force, such as a gravitational force, is applied to the permanent magnet synchronous motor 3, an offset component occurs in the current value of a current flowing through the permanent magnet synchronous motor 3, however, according to the present embodiment, by removing the offset component of the current value by the offset component removal unit 27, the precision of calculation of the estimated torque constant Ks by the estimated torque constant calculation unit 23 is improved. Further, according to the present embodiment, the current value acquired in the current value acquisition unit 18 is corrected in accordance with the friction calculated in the friction calculation unit 25, and therefore, the precision of calculation of the estimated torque constant Ks by the estimated torque constant calculation unit 23 is further improved.

Figure 4:
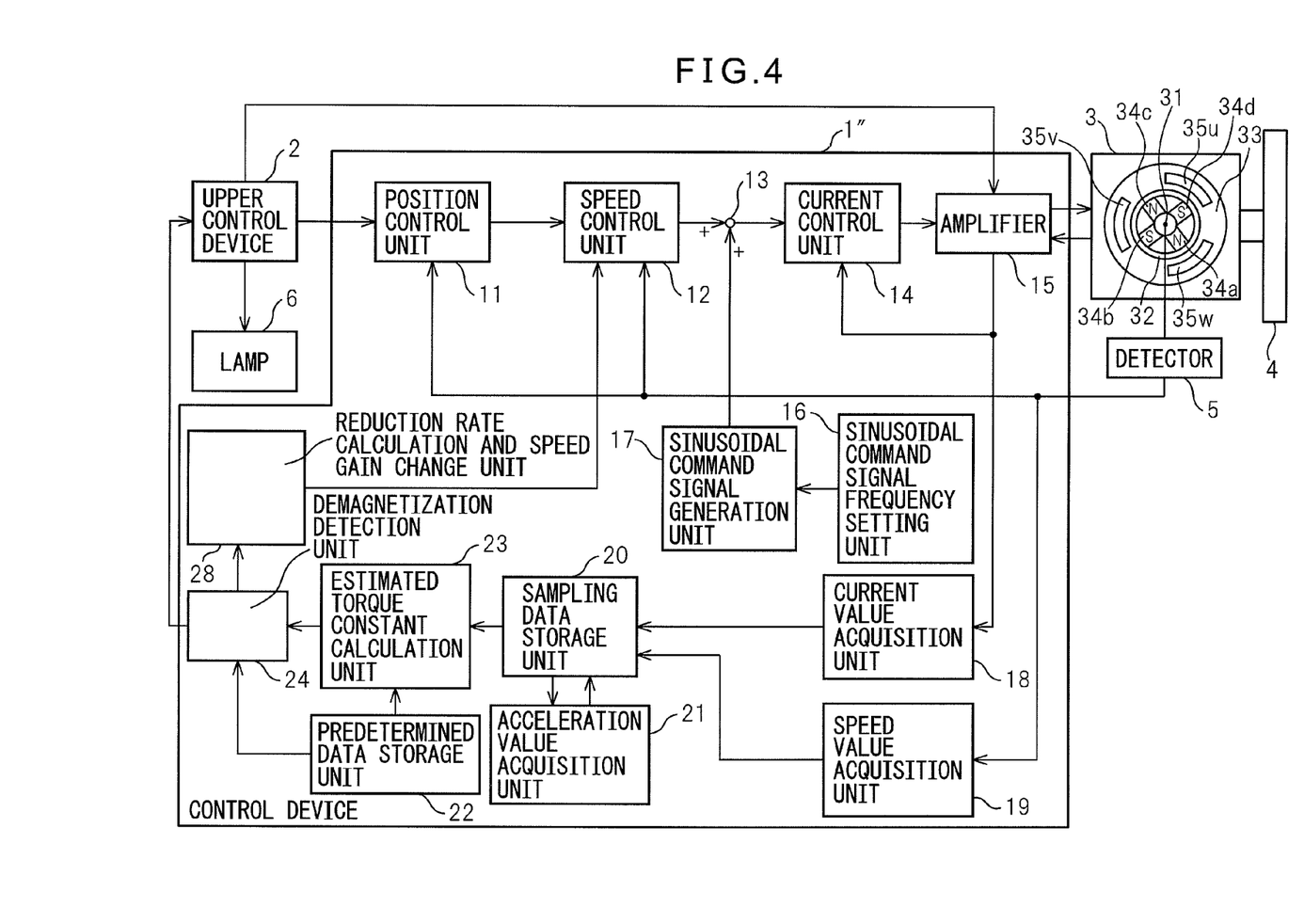
FIG. 4 is a block diagram of a system having a control device of a third embodiment of the present invention.

FIG. 4 is a block diagram of a system having a control device of a third embodiment of the present invention. In FIG. 4, a control device 1″ further comprises a reduction rate calculation and speed gain change unit 28 in addition to the components of the control device 1 in FIG. 1.

The reduction rate calculation and speed gain change unit 28 calculates a reduction rate a according to the expression σ=Ks/Kt and changes the speed gain of the permanent magnet synchronous motor 3 based on the reduction rate σ. For example, the reduction rate calculation and speed gain change unit 28 changes a speed integral gain K1 and a speed proportional gain K2 according to the expressions K1=K1/σ and K2=K2/σ, respectively.

The calculation of the reduction rate σ and the change of the speed gain by the reduction rate calculation and speed gain change unit 28 are performed in step S9 of the flowchart in FIG. 2.

According to the present embodiment, when the difference between the estimated torque constant Ks and the actual torque constant Kt is comparatively small, for example, when the difference between the estimated torque constant Ks and the actual torque constant Kt is smaller than the demagnetization level 1 and larger than the demagnetization level 2, by changing the speed gain, it is possible to stabilize the operation of the permanent magnet synchronous motor 3. The speed gain is in inverse proportion to the actual torque constant Kt, and therefore, when the difference between the estimated torque constant Ks and the actual torque constant Kt is comparatively small, by increasing the speed gain so as to be in inverse proportion to the difference between the estimated torque constant Ks and the actual torque constant Kt, it is possible to stabilize the operation of the permanent magnet synchronous motor 3.

The present invention is not limited to the above-mentioned embodiments and there can be a number of alterations and modifications. For example, in the above-mentioned embodiments, the case where the rotary servomotor in which the permanent magnets 34a, 34b, 34c, and 34d are provided in the rotor 32 is used as the permanent magnet synchronous motor 3, is explained, however, it is possible to use a rotary servomotor in which permanent magnets are provided in the stator, a linear servomotor in which permanent magnets are provided in any one of a stator and a slider, a vibration servomotor in which permanent magnets are provided in any one of a stator and a vibrator, etc., as the permanent magnet synchronous motor 3.

Further, in the above-mentioned embodiments, the case where the sinusoidal command signal is added to the torque command signal, is explained, however, it is possible to add the sinusoidal command signal to the position command signal or the speed command signal instead of adding to the torque command signal. When the rigidity of the driven object including the permanent magnet synchronous motor 3 is high, it is preferable to add the sinusoidal command signal to the torque command signal and in this case, it is possible to increase the frequency of the torque command signal. If the frequency can be increased, it is possible to obtain a large acceleration, and therefore, precision is improved and the rotation angle of the rotor can be reduced, and further, it is possible to reduce the estimation time. On the other hand, when the rigidity is low, the estimation precision deteriorates due to an influence of backlash, lost motion of a spring, etc. Therefore, it is necessary to reduce the signal frequency, however, if the signal frequency is reduced, it is no longer possible to obtain a sufficient acceleration due to the influence of speed control and position control. In this case, it is preferable to add the sinusoidal command signal to the position command signal or the speed command signal.

In the above-mentioned embodiments, the case where the average current I is calculated as the current representative value, which is obtained by averaging the absolute value of the maximum value of the current feedback value and the absolute value of the minimum value of the current feedback value in each period of the sinusoidal command signal over the plurality of periods and the average acceleration a' is calculated as the acceleration representative value, which is obtained by averaging the absolute value of the maximum value of the acceleration value and the absolute value of the minimum value of the acceleration value in each period over the plurality of periods, is explained, however, the current representative value and the acceleration representative value are not limited to the above. For example, it is also possible to calculate the sum of the absolute values of the current feedback values over a plurality of periods of the sinusoidal command signal as the current representative value and to calculate the sum of the absolute values of the acceleration feedback values over a plurality of periods of the sinusoidal command signal as the acceleration representative value.

Further, the case where the lamp 6 is used to generate an alarm, is explained, however, it is also possible to use a liquid crystal display (LED), a buzzer, etc., in order to generate an alarm.

As above, the present invention is explained in relation to the preferred embodiments thereof, however, persons skilled in the art should understand that there can be a variety of alterations and modifications without deviating from the scope of claims, as described later.

The invention claimed is:
1. A control device comprising:
a sinusoidal command signal generation unit configured to generate a sinusoidal command signal to any one of a position command signal, a speed command signal, and a torque command signal supplied to a permanent magnet synchronous motor;

a current value acquisition unit configured to acquire a current value of a current flowing through said permanent magnet synchronous motor;

an acceleration value acquisition unit configured to acquire an acceleration value of the permanent magnet synchronous motor;

an estimated torque constant calculation unit configured to calculate an estimated torque constant relating to said permanent magnet synchronous motor from any one set of a first set, which consists of an average current obtained by averaging the absolute value of the maximum value of a current feedback value and the absolute value of the minimum value of the current feedback value in each period of the sinusoidal command signal over a plurality of periods and an average acceleration obtained by averaging the absolute value of the maximum value of an acceleration value and the absolute value of the minimum value of the acceleration value in each period of the sinusoidal command signal over the plurality of periods, and a second set, which consists of the sum of the absolute values of the current feedback values over a plurality of periods of the sinusoidal command signal the sum of the absolute values of the acceleration feedback values over a plurality of periods of the sinusoidal command signal, and a predetermined inertia relating to said permanent magnet synchronous motor; and a demagnetization detection unit configured to detect whether or not irreversible demagnetization has occurred in a permanent magnet of said permanent magnet synchronous motor based on a difference between said estimated torque constant and a predetermined torque constant relating to said permanent magnet synchronous motor.

2. The control device according to claim 1, further comprising:

a friction calculation unit configured to calculate friction in accordance with a speed value or a polarity of speed of said permanent magnet synchronous motor; and a corrected current value generation unit configured to generate a corrected current value, which is said current value corrected in accordance with said friction.

3. The control device according to claim 1, further comprising:

an offset component removal unit configured to remove an offset component of the current value of the current flowing through said permanent magnet synchronous motor.

4. The control device according to claim 1, wherein the demagnetization detection unit compares said difference with each of a plurality of demagnetization levels and generates an alarm when irreversible demagnetization occurs in said permanent magnet of the permanent magnet synchronous motor, or outputs comparison results between the difference and each of said plurality of demagnetization levels in order to limit the operation of said permanent magnet synchronous motor.

5. The control device according to claim 1, further comprising:

a reduction rate calculation and speed gain change unit configured to calculate a reduction rate of the torque constant of said permanent magnet synchronous motor based on said estimated torque constant and said predetermined torque constant and to change a speed gain of said permanent magnet synchronous motor based on said reduction rate.

* * * * *